(12) United States Patent
Harasaki

(10) Patent No.: US 11,226,637 B2
(45) Date of Patent: Jan. 18, 2022

(54) TRAVELING VEHICLE SYSTEM, AND CONTROL METHOD FOR TRAVELING VEHICLE SYSTEM

(71) Applicant: Murata Machinery, Ltd., Kyoto (JP)

(72) Inventor: Kazumi Harasaki, Inuyama (JP)

(73) Assignee: Murata Machinery, Ltd., Kyoto (JP)

(*) Notice: Subject to any disclaimer, the term of this patent is extended or adjusted under 35 U.S.C. 154(b) by 305 days.

(21) Appl. No.: 16/325,525

(22) PCT Filed: Jul. 10, 2017

(86) PCT No.: PCT/JP2017/025107
§ 371 (c)(1),
(2) Date: Feb. 14, 2019

(87) PCT Pub. No.: WO2018/037741
PCT Pub. Date: Mar. 1, 2018

(65) Prior Publication Data
US 2019/0196500 A1    Jun. 27, 2019

(30) Foreign Application Priority Data
Aug. 22, 2016  (JP) .............................. JP2016-161834

(51) Int. Cl.
*G05D 1/02*    (2020.01)

(52) U.S. Cl.
CPC ............. *G05D 1/0287* (2013.01); *G05D 1/02* (2013.01); *G05D 1/0268* (2013.01); *G05D 2201/0216* (2013.01)

(58) Field of Classification Search
CPC .... B65G 1/0457; B65G 43/00; G05D 1/0027; G05D 1/0268; G05D 1/0276;
(Continued)

(56) References Cited

U.S. PATENT DOCUMENTS

| 9,758,308 B1* | 9/2017 | Nishikawa | ........ H01L 21/67294 |
| 2007/0016366 A1* | 1/2007 | Nagasawa | ............ G05D 1/0223 701/413 |

(Continued)

FOREIGN PATENT DOCUMENTS

| EP | 2 857 918 A1 | 4/2015 |
| JP | H11-143538 A | 5/1999 |

(Continued)

OTHER PUBLICATIONS

Notification of Reason for Refusal dated Jun. 30, 2020, of counterpart Korean Application No. 10-2019-7005178, along with an English translation.

(Continued)

*Primary Examiner* — Anshul Sood
(74) *Attorney, Agent, or Firm* — DLA Piper LLP (US)

(57) ABSTRACT

A traveling vehicle system includes a plurality of traveling vehicles; and a host controller in which: a first deriver derives a first traveling vehicle scheduled to pass through a branching part through which a priority traveling vehicle selected by a priority traveling vehicle selector is scheduled to pass; a merging part deriver derives a merging part through which the first traveling vehicle is scheduled to pass after the branching part; and passage permission for the merging part is transmitted to the first traveling vehicle in priority to a second traveling vehicle scheduled to pass through the merging part from a direction different from a direction from which the first traveling vehicle is scheduled to pass through the merging part.

15 Claims, 10 Drawing Sheets

(58) Field of Classification Search
CPC .. G05D 1/0282; G05D 1/0287; G05D 1/0289; G05D 1/0291; G05D 1/029; G05D 3/12; G05D 3/14; G05D 2201/0216; H01L 21/67276; H01L 21/67259; H01L 21/677
See application file for complete search history.

(56) References Cited

U.S. PATENT DOCUMENTS

| | | | |
|---|---|---|---|
| 2011/0106341 A1 | 5/2011 | Kinoshita | |
| 2011/0178657 A1 | 7/2011 | Harasaki | |
| 2017/0283182 A1* | 10/2017 | Maejima | ........... H01L 21/67715 |

FOREIGN PATENT DOCUMENTS

| | | | |
|---|---|---|---|
| JP | 2001-195128 A | 7/2001 |
| JP | 3491195 B | 11/2003 |
| JP | 2004-334724 A | 11/2004 |
| JP | 2005-225662 A1 | 8/2005 |
| JP | 2010-134581 A | 6/2010 |
| WO | 2009/142051 A1 | 11/2009 |
| WO | 2010/035411 A1 | 4/2010 |

OTHER PUBLICATIONS

The Extended European Search Report dated Dec. 20, 2019, of counterpart European Application No. 17843228.2.

* cited by examiner

FIG. 3(A)

```
                             SD
HOLD INSTRUCTION         TS
CURRENT LOCATION         Pa
DESTINATION              Pb
TRAVELING STATE          VS
LOAD STATE               LS
FORWARD STATE            FS
PASSAGE PERMISSION REQUEST    CN
```

FIG. 3(B)

| TRAVELING VEHICLE ID | INSTRUCTION ID | PRIORITY | CURRENT LOCATION | DESTINATION | TRAVELING STATE | LOAD STATE | FORWARD STATE | PASSAGE PERMISSION REQUEST |
|---|---|---|---|---|---|---|---|---|
| 01 | TS1 | PR1 | Pa1 | Pb1 | VS1 | LS1 | FS1 | CN1 |
| 02 | TS2 | PR2 | Pa2 | Pb2 | VS2 | LS2 | FS2 | CN2 |
| ⋮ | | | | | | | | |

| INTERSECTION ID | INTERSECTION STATE | TRAVELING VEHICLE ID OF PASSAGE PERMISSION REQUEST TRANSMISSION ORIGIN |
|---|---|---|
| 01 | CS1 | N1 |
| 02 | CS2 | N2, N3 |
| ⋮ | | |

SC

TRAVELING VEHICLE SYSTEM, AND CONTROL METHOD FOR TRAVELING VEHICLE SYSTEM

TECHNICAL FIELD

This disclosure relates to a traveling vehicle system and a control method for a traveling vehicle system.

BACKGROUND

In a semiconductor device manufacturing factory or the like, articles accommodating semiconductor wafers or reticles, for example, are transported by a traveling vehicle system. This traveling vehicle system includes a plurality of traveling vehicles traveling on a track and a controller (for example, a host controller) that controls the plurality of traveling vehicles. Each of the plurality of traveling vehicles transmits its current location and the like to the controller by communication such as wireless communication. The controller determines a traveling vehicle that handles transportation of an article on the basis of the location of the traveling vehicle, and the controller transmits a travel instruction to the traveling vehicle.

In general, the track of the traveling vehicle system as described above has an intersection that is either a branching part or a merging part (for example, see International Publication No. 2009/142051). In International Publication No. 2009/142051, when a traveling vehicle attempts to pass through an intersection, the traveling vehicle transmits a request for a passage permission for the intersection to the controller. The controller grants the passage permission to one of the traveling vehicles requesting the passage permission for each intersection. The traveling vehicle enters the intersection if the passage permission is granted from the controller, but stops at a location short of the intersection if the passage permission is not granted.

For example, when a priority traveling vehicle that performs transportation in priority to other traveling vehicles is set, if there is a traveling vehicle (monitored traveling vehicle) preceding the priority traveling vehicle, the monitored traveling vehicle may not in some instances be granted passage permission for a merging part that deviates from the scheduled traveling route of the priority traveling vehicle. For example, when there is another traveling vehicle scheduled to enter the merging part from another route and that has earlier requested passage permission, the monitored traveling vehicle is not granted passage permission until the other traveling vehicle has passed through the merging part and the monitored traveling vehicle stops at a location short of the merging part. As a result, a situation occurs where the priority traveling vehicle cannot pass through the branching part and prioritized traveling of the priority traveling vehicle becomes impossible. In response to such a situation, in Japanese Unexamined Patent Application, First Publication No. 2004-334724, when a traveling vehicle is set to serve as a priority traveling vehicle that performs transportation in priority to other traveling vehicles according to the destination or the type of an object being transported, it is determined whether or not there is a monitored traveling vehicle preceding the priority traveling vehicle, and if there is a monitored traveling vehicle preceding the priority traveling vehicle, the preceding monitored traveling vehicle is changed to a priority traveling vehicle and allowed to pass through a section in contention with priority.

In Japanese Unexamined Patent Application, First Publication No. 2004-334724 mentioned above, when determining whether or not there is a traveling vehicle preceding the priority traveling vehicle, for example, a method in which a search is performed for a scheduled traveling route of the priority traveling vehicle and a scheduled traveling route of the preceding traveling vehicle and the routes are cross-checked may be considered. However, the processing of searching for routes and cross-checking the routes is complicated. The processing becomes more complicated when there are a plurality of preceding traveling vehicles. Moreover, the processing becomes even more complicated when, after changing a preceding traveling vehicle to a priority traveling vehicle, it is determined whether or not there is a traveling vehicle preceding the new priority traveling vehicle.

In view of the above circumstances, it could be helpful to provide a traveling vehicle system capable of allowing a traveling vehicle preceding a priority traveling vehicle to smoothly pass through a merging part by simple control to ensure prioritized traveling of the priority traveling vehicle, and a control method for a traveling vehicle system.

SUMMARY

I thus provide:

A traveling vehicle system comprising: a host controller; and a plurality of traveling vehicles that travel on a track having an intersection in a form of either a branching part or a merging part, that transmit to the host controller a passage permission request for the intersection through which the traveling vehicle is scheduled to pass, and that pass through the intersection if a passage permission for the passage permission request is received from the host controller but stops before the intersection if the passage permission is not received; wherein the host controller includes: a memory storage that stores traveling vehicle information in which the passage permission request received from the traveling vehicle is associated with the traveling vehicle of the transmission origin thereof; a priority traveling vehicle selector that selects a priority traveling vehicle from the plurality of traveling vehicles; a first deriver that derives a first traveling vehicle, which is the transmission origin of the passage permission request for the branching part, from the traveling vehicle information already stored in the memory storage, at the time of receiving the passage permission request for the branching part from the priority traveling vehicle; a merging part deriver that derives, from the traveling vehicle information stored in the memory storage, a merging part through which the first traveling vehicle is scheduled to pass after the branching part; and an intersection controller that transmits the passage permission for the derived merging part to the first traveling vehicle in priority to a second traveling vehicle that is scheduled to pass through the merging part from a direction different from a direction from which the first traveling vehicle is scheduled to pass through the merging part.

A control method for a traveling vehicle system comprising: a host controller; and a plurality of traveling vehicles that travel on a track having an intersection in a form of either a branching part or a merging part, that transmit to the host controller a passage permission request for the intersection through which the traveling vehicle is scheduled to pass, and that pass through the intersection if a passage permission for the passage permission request is received from the host controller but stop before the intersection if the passage permission is not received; the control method comprising: receiving the passage permission request from the traveling vehicle; transmitting the passage permission to one of the plurality of traveling vehicles requesting the passage permission; storing traveling vehicle information in which the passage permission request received from the traveling vehicle is associated with the traveling vehicle of the transmission origin thereof; selecting a priority traveling vehicle from the plurality of traveling vehicles; deriving a first traveling vehicle, which is the transmission origin of the passage permission request for the branching part, from the traveling vehicle information already stored, at the time of receiving the passage permission request for the branching part from the priority traveling vehicle; deriving, from the stored traveling vehicle information, the merging part through which the first traveling vehicle is scheduled to pass after the branching part; and transmitting the passage permission for the derived merging part to the first traveling vehicle in priority to a second traveling vehicle that is scheduled to pass through the merging part from a direction different from a direction from which the first traveling vehicle is scheduled to pass through the merging part.

A second deriver that derives the second traveling vehicle from the traveling vehicle information stored in the memory storage may be further included, and the intersection controller may suspend transmission of the passage permission for the merging part to the second traveling vehicle derived by the second deriver.

The traveling vehicle may include: a determiner that determines whether or not there is the intersection within a predetermined distance of scheduled traveling of the traveling vehicle, on the basis of a current location of the traveling vehicle; and a communicator that transmits the passage permission request for the intersection to the host controller if there is the intersection within this distance. Moreover, the priority traveling vehicle may have the predetermined distance that is relatively long among the plurality of traveling vehicles.

When one of a plurality of directions toward the merging part can be set as a priority direction for which the passage permission is not granted to the traveling vehicle traveling toward the merging part from another direction so long as the passage permission request for the direction is present, the intersection controller may suspend transmission of the passage permission for the merging part to the second traveling vehicle by setting the traveling direction of the first traveling vehicle traveling toward the merging part as a priority direction. When suspending transmission of the passage permission for the merging part to the second traveling vehicle, when the passage permission has been transmitted to a third traveling vehicle preceding the second traveling vehicle, the intersection controller may transmit to the third traveling vehicle cancellation information to cancel the passage permission for the third traveling vehicle, and the third traveling vehicle may stop at a location short of the merging part if the merging part has not been passed when the cancellation information is received.

In the traveling vehicle system and the control method for the traveling vehicle system, a passage permission for a merging part that deviates from a scheduled traveling route of the priority traveling vehicle is granted in priority to the first traveling vehicle preceding the priority traveling vehicle and, therefore, even when a traveling vehicle is scheduled to enter the merging part from a direction different from a direction from which the first traveling vehicle is scheduled to pass through the merging part, the first traveling vehicle is prevented from stopping at a location short of the merging part. As a result, the first traveling vehicle departs from the branching part early and, therefore, the priority traveling vehicle can smoothly pass through the branching part and can travel with priority. Furthermore, the merging part deriver can easily identify the merging part through which the first traveling vehicle is scheduled to pass after the branching part. Moreover, since the first deriver derives the first traveling vehicle scheduled to pass through the branching part, the first traveling vehicle preceding the priority traveling vehicle can be derived without searching for the route of the traveling vehicle, making the process of deriving the first traveling vehicle simple. Therefore, by simple control, the possibility of the first traveling vehicle having to wait to pass through the merging part before passing through the branching part is reduced, and the priority traveling vehicle can be allowed to pass smoothly through the branching part.

In the traveling vehicle system including the second deriver mentioned above, the second deriver derives the second traveling vehicle from the traveling vehicle information stored in the memory storage and, as a result, the process of deriving the second traveling vehicle becomes simple.

In the traveling vehicle system including the determiner and the communicator mentioned above, the determiner of the traveling vehicle determines whether or not there is an intersection within a predetermined distance on the basis of the current location of the traveling vehicle and, as a result, the presence or absence of the intersection can be accurately determined, and it is possible to accurately transmit a passage permission request from the traveling vehicle. Further, in the traveling vehicle system in which the predetermined distance of the priority traveling vehicle is relatively long among the plurality of traveling vehicles, the timing of passage permission request transmission from the priority traveling vehicle can be made earlier and, as a result, the intersection controller can easily ensure the route of the priority traveling vehicle.

In the traveling vehicle system in which the traveling direction of the first traveling vehicle is set to the priority direction, the priority direction is prioritized over the traveling direction of the second traveling vehicle and, as a result, the process of suspending transmission of a passage permission to the second traveling vehicle can be simplified. Moreover, in the traveling vehicle system in which the cancellation information is transmitted to the third traveling vehicle preceding the second traveling vehicle, the first traveling vehicle can be allowed to pass through the merging part first if the third traveling vehicle is yet to pass through the merging part and, as a result, it is possible to allow the priority traveling vehicle to pass through the merging part more smoothly.

BRIEF DESCRIPTION OF THE DRAWINGS

FIGS. 3(A)-3(C) are diagrams showing an example of state information transmitted by a traveling vehicle, and a state table and intersection information stored by the host controller.

DESCRIPTION OF REFERENCE SIGNS

Figure 1:
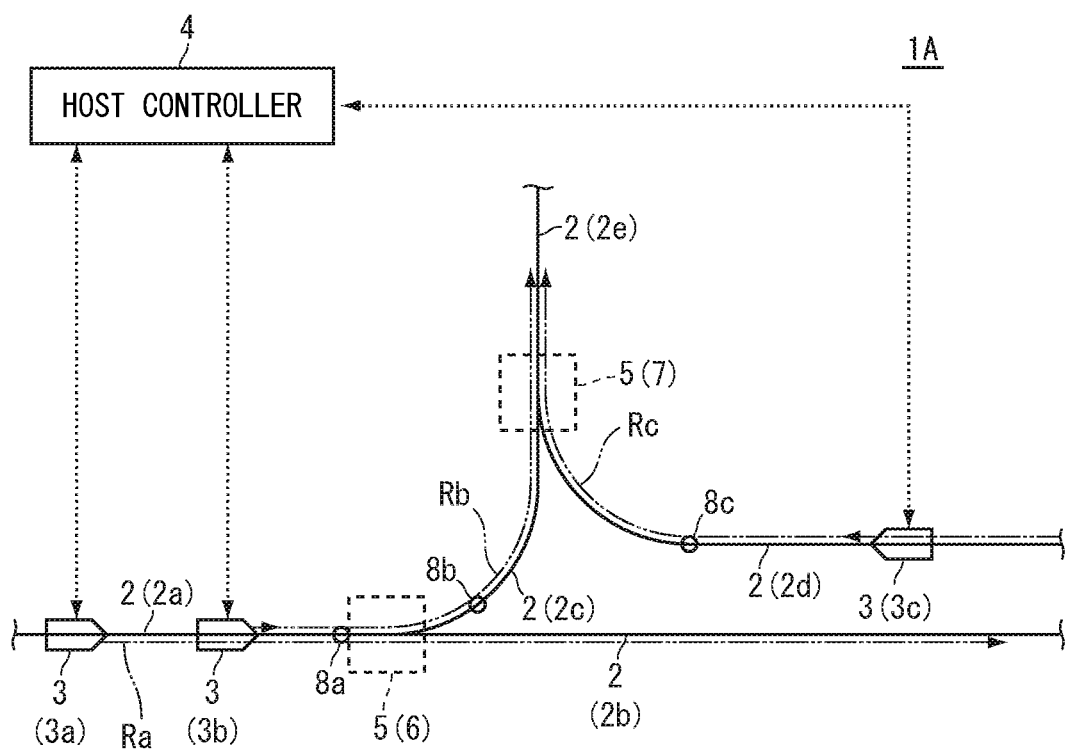
FIG. 1 is a diagram showing a traveling vehicle system according to a first example.

1A Traveling vehicle system
2 Track
3 Traveling vehicle
3a Priority traveling vehicle
3b Traveling vehicle (first traveling vehicle)
3c Traveling vehicle (second traveling vehicle)
3d Traveling vehicle (third traveling vehicle)
5 Intersection
6 Branching part
7 Merging part
17 Determiner
18 Communicator (first communicator)
19 Memory storage
22 Intersection controller
23 First deriver
24 Second deriver
25 Communicator (second communicator)
26 Memory storage
27 Priority setter
28 Priority traveling vehicle selector
29 Merging part deriver
PP Passage permission
RF Predetermined distance
SC Intersection information
SD State information (passage permission request)

DETAILED DESCRIPTION

The following describes examples with reference to the drawings. FIG. 1 is a diagram showing a traveling vehicle system according to a first example. A traveling vehicle system 1A includes a track 2, a plurality of traveling vehicles 3, and a host controller 4. The traveling vehicle system 1A is, for example, a transport system installed in a semiconductor device manufacturing factory, and transports containers such as a FOUP accommodating semiconductor wafers used to manufacture semiconductor devices, and a reticle pod accommodating processing members such as a reticle.

Each of the plurality of traveling vehicles 3 travels along the track 2. Hereunder, the plurality of traveling vehicles 3 are respectively denoted by symbol 3 when not distinguished from one another, and are denoted by symbols 3a, 3b, 3c, and the like when distinguished from one another. In the following description, it is assumed that the traveling vehicle 3a is a priority traveling vehicle. The priority traveling vehicle 3a is, for example, a traveling vehicle transporting an express lot, or a traveling vehicle traveling to a location to which the express lot is delivered. In FIG. 1, three traveling vehicles 3a, 3b, 3c are illustrated as an example. However, the number of traveling vehicles 3 included in the traveling vehicle system 1A may be arbitrarily set.

The traveling vehicle 3 is, for example, an overhead traveling vehicle, and the track 2 is a traveling rail provided on the ceiling of a clean room or the like. The track 2 includes a branching part 6 and a merging part 7 as intersections 5. The branching part 6 is, for example, a blocking area, and includes a branching point where one traveling rail branches into a plurality (for example, two) of traveling rails. The track 2 has a plurality of sections 2a to 2e, and the branching part 6 is a portion that branches from section 2a to section 2b and section 2c.

The merging part 7 is, for example, a blocking area, and includes a merging point at which a plurality (for example, two) of traveling rails merge into a single traveling rail. The merging part 7 is a portion where the section 2c and the section 2d merge into the section 2e. When one traveling vehicle 3 is present in the above blocking area, other traveling vehicles are prohibited from entering the blocking area. The traveling vehicle 3 may be a rail-guided trolley or the like that travels on the ground and, in this example, the track 2 is provided on a floor or the like.

The track 2 is provided adjacent to a processing apparatus (not shown in the figure) or a stocker (not shown in the figure) or the like. The above processing apparatus is, for example, an exposure apparatus, a coater/developer, a film forming apparatus, or an etching apparatus, and performs various processes on a semiconductor wafer in a container transported by the traveling vehicle 3. The above stocker (automated warehouse) stores the container transported by the traveling vehicle 3.

The traveling vehicle 3 transmits state information of the traveling vehicle 3 (described later with reference to FIG. 3(A)) to the host controller 4. The host controller 4 generates a travel instruction on the basis of the state information received from the traveling vehicle 3. The traveling vehicle 3 travels on the track 2 upon receiving the travel instruction from the host controller 4. The travel instruction includes information on the traveling route on which the traveling vehicle 3 is scheduled to travel when transporting a predetermined load. The traveling route information is a piece of information that specifies at least a part of the traveling route from a departure point to a destination point of the traveling vehicle 3.

For example, the traveling route may include a main route and a sub-route, and the travel instruction may represent a traveling route with a part of the main route omitted. The above main route is a route selected when the sub-route is not specified. When a part of the main route is omitted in the travel instruction, the traveling vehicle 3 preliminarily holds the information of the main route, and the traveling route is restored by complementing, with the main route, the route for which the sub-route is not specified in the travel instruction.

A route Ra on which the priority traveling vehicle 3a is scheduled to travel continues from the section 2a to the section 2b via the branching part 6. The traveling vehicle 3b is a traveling vehicle (first traveling vehicle) traveling ahead in the traveling direction of the priority traveling vehicle 3a. A route Rb on which the traveling vehicle 3b is scheduled to travel continues from the section 2a to the section 2c via the branching part 6, and continues from the section 2c to the section 2e via the merging part 7. The traveling vehicle 3c is a traveling vehicle (second traveling vehicle) scheduled to travel on a route Rc that partially overlaps with the route Rb. A route Rc is a route that continues from the section 2d to the section 2e via the merging section 7, and the route Rb of the traveling vehicle 3b overlaps with the section 2e after the branching part 6.

The host controller 4 determines (controls) whether or not to permit passage (travel) through the intersection 5 for the traveling vehicle 3 scheduled to pass (scheduled to travel)

through the intersection 5. The traveling vehicle 3 passes through the intersection 5 when passage through the intersection 5 is permitted by the host controller 4. When the host controller 4 does not permit passage through the intersection 5, the traveling vehicle 3 either stops at a waiting position short of the intersection 5, or decelerates and travels toward the waiting position. For example, when passage through the branching part 6 is not permitted, the traveling vehicle 3*b* stops at a waiting position 8*a* of the branching part 6. Symbol 8*b* denotes a waiting position of the merging part 7 in the section 2*c*, and symbol 8*c* denotes a waiting position of the merging part 7 in the section 2*d*.

Figure 2:
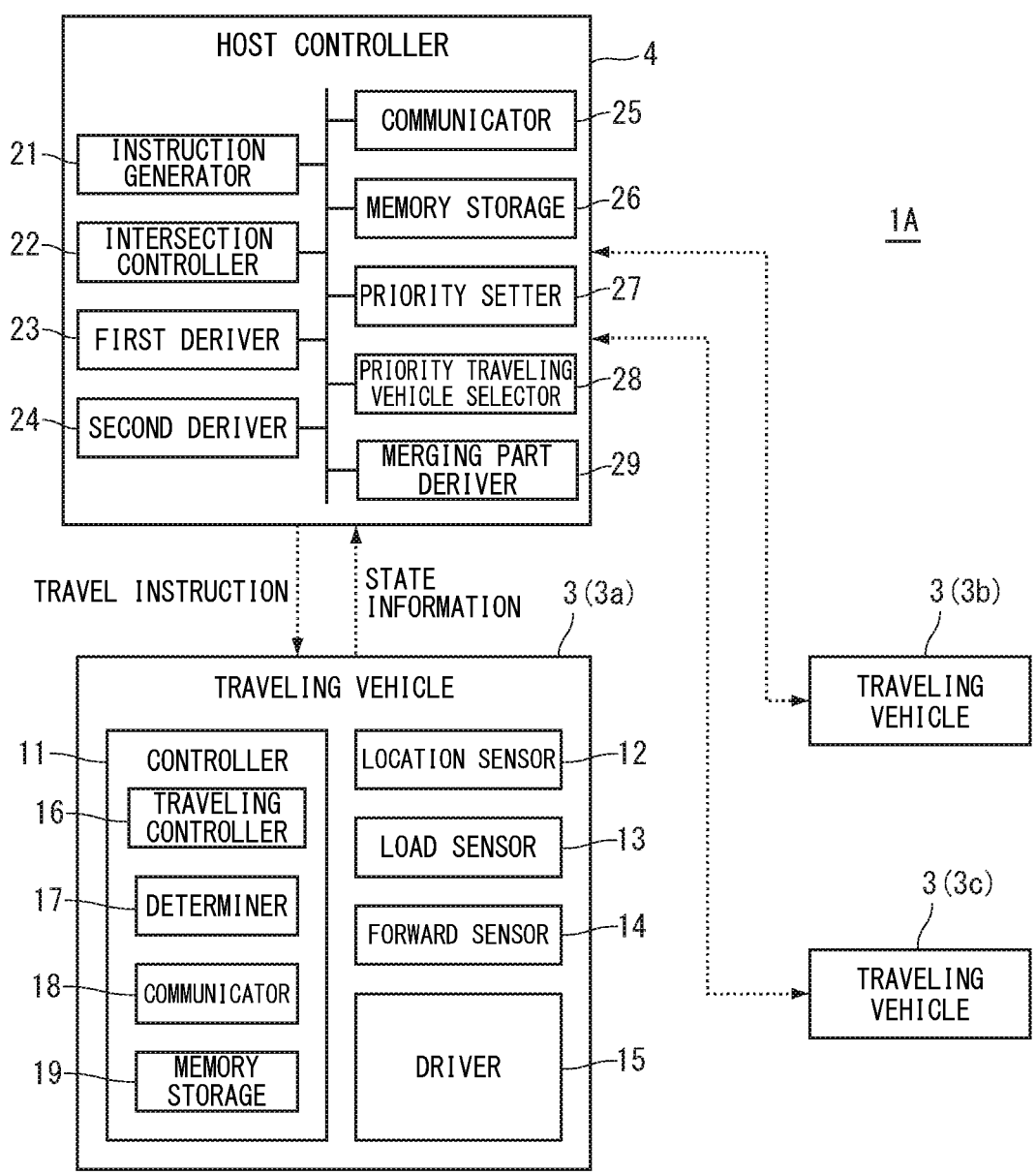
FIG. 2 is a diagram showing a host controller and traveling vehicles.

FIG. 2 is a diagram showing the host controller and the traveling vehicles. FIGS. 3(A)-3(C) are diagrams showing examples of state information transmitted by the traveling vehicle, and a state table and intersection information stored by the host controller. Each of the plurality of traveling vehicles 3 shown in FIG. 1 has the same configuration. The configuration of the priority traveling vehicle 3*a* will be described representatively, and description of the configuration of the other traveling vehicles 3 will be omitted. The priority traveling vehicle 3*a* includes a controller 11, a location sensor 12, a load sensor 13, a forward sensor 14, and a driver 15. The driver 15 supplies a driving force for the traveling vehicle 3 to travel. Further, the driver 15 supplies a driving force used for load handling such as loading and unloading of a load.

The location sensor 12 detects a current location of the priority traveling vehicle 3*a*. The location sensor 12 is connected to the controller 11 to be capable of wired or wireless communication, and supplies the detected current location of the traveling vehicle 3 to the controller 11. The load sensor 13 detects the presence or absence of a load. The load sensor 13 is connected to the controller 11 to be capable of wired or wireless communication and supplies the detection result to the controller 11. The forward sensor 14 monitors forward in the advancing direction (traveling direction) of the priority traveling vehicle 3*a* and detects whether or not another traveling vehicle (for example, traveling vehicle 3*b*) is present in front thereof. The forward sensor 14 is connected to the controller 11 to be capable of wired or wireless communication and supplies the detection result to the controller 11.

One or both of the location sensor 12 and the forward sensor 14 need not be mounted on the priority traveling vehicle 3*a*, and may be arranged, for example, on the track 2 or the like. The traveling vehicle system 1A need not include at least one of the location sensor 12, the load sensor 13, and the forward sensor 14, and may include another type of sensor.

The controller 11 is mounted on the priority traveling vehicle 3*a* and controls each part of the traveling vehicle 3 upon receiving a travel instruction from the host controller 4. The controller 11 includes a traveling controller 16, a determiner 17, a communicator 18 (second communicator), and a memory storage 19. The communicator 18 is connected to the communicator 25 of the host controller 4 to be capable of communicating by a wireless LAN or the like. The communicator 18 receives a travel instruction from the communicator 25 of the host controller 4 and stores the received travel instruction in the memory storage 19.

The traveling controller 16 controls each part of the traveling vehicle 3 on the basis of the travel instruction stored in the memory storage 19. For example, the traveling controller 16 controls the driver 15 on the basis of a traveling route defined by the travel instruction and causes the traveling vehicle 3 to travel along the traveling route. The traveling controller 16 causes the various sensors (such as the location sensor 12) mounted on the traveling vehicle 3 to execute detection and stores the detection result in the memory storage 19.

The determiner determines, on the basis of the current location of the traveling vehicle 3, whether or not there is an intersection 5 within a predetermined distance of scheduled traveling of the traveling vehicle 3. The predetermined distance is, for example, a distance from the current location of the traveling vehicle 3 to a predetermined location forward in the traveling direction (for example, 10 m ahead). The determiner 17 performs the above determination at predetermined time intervals. For example, the determiner 17 acquires the current location of the traveling vehicle 3 detected by the location sensor 12 from the memory storage 19. The determiner 17 multiplies the traveling speed of the traveling vehicle 3 by the predetermined time interval to calculate a travel distance that the traveling vehicle 3 travels in a predetermined time. Then, the determiner 17 adds the travel distance to the current location of the traveling vehicle 3 to calculate the predetermined distance. The determiner 17 then compares the traveling route defined by the travel instruction with the predetermined distance to determine whether or not there is an intersection 5 within the predetermined distance. The determiner 17 stores the determination result in the memory storage 19. The predetermined distance may be a preset fixed value and, in this example, the determiner 17 need not calculate the predetermined distance.

Moreover, for the priority traveling vehicle 3*a*, the predetermined distance may be relatively long among the plurality of traveling vehicles 3. For example, the predetermined distance of the traveling vehicles 3 other than the priority traveling vehicle 3*a* may be 10 m and the predetermined distance of the priority traveling vehicle may be 20 m. The host controller 4, for example, may notify the priority traveling vehicle 3*a* that it is a priority traveling vehicle in the travel instruction, and the determiner 17 may calculate the predetermined distance by adding an offset (for example, 10 m) to the traveling distance that the traveling vehicle 3 travels in the predetermined time, or by multiplying the traveling distance that the traveling vehicle 3 travels in the predetermined time by a predetermined multiple greater than 1 (for example, 2). Also, the predetermined distance (for example, 20 m) in the priority traveling vehicle and the predetermined distance (10 m) in not the priority traveling vehicle may be preliminarily set as fixed values respectively, and the determiner 17 may switch the value of the predetermined distance according to whether or not it is the priority traveling vehicle.

The traveling controller 16 uses information stored in the memory storage 19 to generate state information SD of the traveling vehicle 3 (see FIG. 3(A)). In the example of FIG. 3(A), the state information SD includes holding information (TS), current location (Pa), destination (Pb), traveling state (VS), load state (LS), forward state (FS), and passage permission request (CN). The holding information (TS) is defined by the travel instruction or the like stored in the memory storage 19 and is instruction information held by the traveling vehicle 3. The current location (Pa) is information of a current location of the traveling vehicle 3 detected by the location sensor 12. The destination (Pb) is defined by the travel instruction or the like stored in the memory storage 19 and is information indicating a destination of the traveling vehicle 3.

The traveling state (VS) is information indicating a current speed of the traveling vehicle 3. For example, the traveling state (VS) indicates that the traveling vehicle 3 is traveling when the speed is greater than 0, and the traveling vehicle 3 is in a stop state when the speed is 0. The load state (LS) includes information indicating the presence or absence of a load detected by the load sensor 13, information on the type of load being transported (for example, an identification number assigned to the load) and the like. The forward state (FS) is information of the forward side of the traveling vehicle 3 detected by the forward sensor 14 and indicates whether or not another traveling vehicle 3 is present in front of the traveling vehicle 3 within a detection range of the forward sensor 14.

The passage permission request (CN) is information indicating whether or not there is an intersection 5 through which the traveling vehicle 3 is scheduled to pass within a predetermined time. The passage permission request (CN) is represented by, for example, an identification number (for example, the ID of an intersection) preliminarily assigned to each intersection 5 when there is an intersection 5 scheduled to be passed. The passage permission request (CN) may be represented by a preliminarily set number (for example, 0) or by "NULL" when there is no intersection 5 scheduled to be passed. The traveling controller 16 in FIG. 2 generates a passage permission request (CN) on the basis of the determination result of the determiner 17.

The memory storage 19 is a nonvolatile memory or the like and stores various information such as state information. The traveling controller 16 periodically generates the state information and updates the state information stored in the memory storage 19 to the latest state information. The communicator 18 is controlled by the traveling controller 16 to transmit the latest state information stored in the memory storage 19 to the communicator 25 of the host controller 4.

The determiner 17 determines whether or not the intersection 5 is present within the predetermined distance, as a distance that the traveling vehicle 3 travels in a period from the moment where the communicator 18 transmits the current state information to the moment where the communicator 18 transmits the next state information. The communicator 18 transmits the passage permission request generated on the basis of the determination result of the determiner 17 to the communicator 25 as a part of the state information. If the intersection 5 scheduled to be passed through is present before the next state information is transmitted, the traveling vehicle 3 may transmit the state information including the passage permission request in the current state information. The traveling controller 16 need not include the passage permission request in the state information, and the communicator 18 may transmit the passage permission request to the communicator 25 of the host controller 4 separately from the state information.

The host controller 4 includes an instruction generator 21, an intersection controller 22, a first deriver 23, a second deriver 24, a communicator 25, a memory storage 26, a priority setter 27, a priority traveling vehicle selector 28, and a merging part deriver 9. The communicator 25 can communicate with the communicator 18 of the traveling vehicle 3 by a wireless LAN or the like, and receives the state information from the communicator 18. The memory storage 26 stores the state information received by the communicator 25. For example, the memory storage 26 stores a state table ST (shown in FIG. 3(B)) that stores the state of each of the plurality of traveling vehicles 3.

The state table ST is, for example, table data and has items including "traveling vehicle ID", "instruction ID", "priority", "current location", "destination", "traveling state", "load state", and "passage permission request". The "traveling vehicle ID" is an identification number (for example, 01, 02, . . . ) preliminarily assigned to each traveling vehicle 3. The "instruction ID" is information corresponding to the holding information (TS) of the state information SD, and is an identification number (for example, TS1, TS2, . . . ) preliminarily assigned according to the content of the instruction. For example, the instruction held by the traveling vehicle 3 of the "traveling vehicle ID" "01" is represented as "TS1".

The "priority" is a parameter assigned to each traveling vehicle 3. The intersection controller 22 controls passage of the intersection 5 to reduce time delay caused by deceleration, stoppage or the like of the traveling vehicle 3 (for example, priority traveling vehicle 3a) with relatively high "priority" among the plurality of the traveling vehicles 3. The priority setter 27 in FIG. 2 sets the priority on the basis of one or both of the type of load transported by the traveling vehicle 3 and the destination of the traveling vehicle 3. For example, when the load being transported by the traveling vehicle 3 (for example, priority traveling vehicle 3a) is a predetermined type of load (for example, an express lot), the priority setter 27 sets the priority of the traveling vehicle 3 higher than that of other traveling vehicles 3 (for example, traveling vehicle 3c). When the load being transported by the traveling vehicle 3 (for example, traveling vehicle 3b) is not the predetermined type of load, the priority setter 27 sets the priority of the traveling vehicle 3 equal to that of the other traveling vehicles 3 (for example, traveling vehicle 3c). The traveling vehicle 3 the priority of which has been set higher than that of the other traveling vehicles 3 by the priority setter 27 is selected by the priority traveling vehicle selector 28 as the priority traveling vehicle 3a.

The "priority" may be set according to the destination of the traveling vehicle 3. For example, when the destination of the traveling vehicle 3 is set to a processing apparatus of a high operation rate among a plurality of processing apparatuses, the priority setter 27 sets the priority of the traveling vehicle 3 higher than that of the other traveling vehicle 3. The "priority" may be input (designated, or set) by an operator, and in this example, the host controller 4 need not have the priority setter 27. Further, the priority setter 27 may be installed in a separate device from the host controller 4.

The "priority" is, for example, represented as follows: the priority of the traveling vehicle 3 with the "traveling vehicle ID" of "01" is "PR1", and the priority of the traveling vehicle 3 with the "traveling vehicle ID" of "02" is "PR2". The parameter values such as "PR1" and "PR2" are, for example, represented by "99" when the priority is high and "00" when the priority is normal. The "priority" may be a flag that indicates whether or not a priority is given, and may be information that represents the state of being prioritized as "1" and the state of not being prioritized as "0", for example.

The "current location", the "destination", the "traveling state", the "load state" and the "forward state" are information respectively corresponding to current location (Pa), destination (Pb), traveling state (VS), load state (LS), and forward state (FS) of the state information SD (see FIG. 3(A)). For example, the traveling vehicle 3 with the "traveling vehicle ID" of "01" is represented as follows: the "current location" is "Pa1", the "destination" is "Pb1", the "traveling state" is "VS1", the "load state" is "LS1", and the "forward state" is "FS1".

The "passage permission request" corresponds to the passage permission request (CN) of the state information, and is information that represents the status of the passage permission request for each traveling vehicle 3 (for example, the presence or absence of the passage permission request, and the target intersection 5 of passage permission request). For example, the status of the passage permission request of the traveling vehicle 3 of the "traveling vehicle ID" "01" is represented as "CN1". For example, when the traveling vehicle 3 with the "traveling vehicle ID" of "01" is requesting a passage permission, "CN1" is represented by the identification number of the target intersection 5 (hereinafter, referred to as intersection ID) of the passage permission request. Also, when the traveling vehicle 3 with "traveling vehicle ID" of "01" is not requesting a passage permission, "CN1" is represented by a predetermined value (for example, "0"). When the traveling vehicle 3 is not requesting a passage permission, the "passage permission request" may be represented by "NULL" or the like.

The state table ST is updated according to the state information received by the communicator 25. Returning to the description of FIG. 2, the instruction generator 21 determines, on the basis of information of a destination determined according to a preliminarily assigned task (for example, load transportation) or the like and the state table ST, the traveling vehicle 3 assigned to handle the instruction according to this task (transportation instruction, travel instruction). The destination is, for example, an access point (for example, a load port, a buffer, an incoming/outgoing port) where a load can be delivered to or received from the processing apparatus side or the stocker side. The instruction generator 21 determines, on the basis of the "current location" of the traveling vehicle 3 assigned to handle this task, the route on which the traveling vehicle 3 is scheduled to travel, and generates a travel instruction that specifies the determined route.

The intersection controller 22 determines which one of the traveling vehicles 3 of the transmission origin to grant a passage permission for the passage permission request received by the communicator 25. For example, the intersection controller 22 makes reference to intersection information SC in FIG. 3(C) and determines the traveling vehicle 3 to which the passage permission is to be granted. In the example of FIG. 3(C), the intersection information SC has items namely "intersection ID", "intersection state", and "traveling vehicle ID of passage permission request transmission origin".

The "intersection ID" is an identification number (for example, 01, 02, . . . ) assigned to each intersection 5. The "traveling vehicle ID of passage permission request transmission origin" is information in which the identification numbers of the traveling vehicles 3 of transmission origin of the passage permission requests received by the communicator 25 in relation to each intersection 5 are sorted in the order in which the passage permission requests are received. For example, the "traveling vehicle ID of passage permission request transmission origin" is represented as follows: the identification number (traveling vehicle ID) of the traveling vehicle 3 requesting a passage permission for the "intersection ID" "01" is "N1", and the identification numbers (traveling vehicle IDs) of the traveling vehicles 3 requesting a passage permission for the "intersection ID" "02" are "N2", "N3".

The "intersection state" is information indicating that each intersection 5 is either in a blocking state in which passage of the traveling vehicle 3 is prohibited (a state of not granting passage permission) or in an unblocked state in which passage of the traveling vehicle 3 may be permitted (a state of being able to grant passage permission). For example, the "intersection state" of the intersection 5 where the "intersection ID" is "01" is represented as "CS1" or the like. "CS1" is, for example, a flag where the unblocked state is represented by "0" and the blocking state is represented by "1".

When the "intersection state" is in the unblocked state, the intersection controller 22 grants passage permission for this intersection 5. For example, assume that the "intersection state" of an intersection 5 where the "intersection ID" is "01" is the unblocked state. The intersection controller 22 grants a passage permission to the traveling vehicle 3 having the identification number "N1" for the intersection 5 where the "intersection ID" is "01". Having granted the passage permission for the intersection 5 where "intersection ID" is "01", the intersection controller 22 sets the "intersection state" of this intersection 5 to the blocking state. When the traveling vehicle 3 of "N1" has finished passing through the intersection 5 where the "intersection ID" is "01", the intersection controller 22 sets the "intersection state" of this intersection 5 to the unblocked state. The state (entering, passing, having passed) of the traveling vehicle 3 in relation to each intersection 5 may be detected, for example, by a sensor or the like installed at the intersection 5, or the traveling vehicle 3 may include it in the state information to be transmitted to the host controller 4.

The intersection controller 22 generates the intersection information SC mentioned above using the state table ST of FIG. 3(B), and stores the intersection information SC in the memory storage 26. For example, in the intersection 5 with the "intersection ID" "02" where the plurality of the traveling vehicles 3 (traveling vehicle IDs "N2", "N3") are requesting a passage permission, the intersection controller 22 registers the traveling vehicle IDs to "traveling vehicle ID of passage permission request transmission origin" in the order in which the communicator 25 received the passage permission requests. For example, in relation to the intersection 5 where the "intersection ID" is "02", the communicator 25 has received the passage permission request from the traveling vehicle 3 of the traveling vehicle ID "N2" before receiving the passage permission request from the traveling vehicle 3 of the traveling vehicle ID "N3". The intersection controller 22 grants passage permissions in the order in which the traveling vehicle IDs are sorted in the "traveling vehicle ID of passage permission request transmission origin". For example, the intersection controller 22 grants a passage permission to the traveling vehicle 3 of the traveling vehicle ID "N3" after having granted a passage permission to the traveling vehicle 3 of traveling vehicle ID "N2".

Next, control performed when a traveling vehicle passes through an intersection is described. The host controller 4 according to the example determines the traveling vehicle 3 permitted to pass through the intersection 5, according to the presence or absence of a priority traveling vehicle 3a. First, the control when there is no priority traveling vehicle 3a will be described, with reference to FIGS. 4(A)-4(D). FIGS. 4(A)-4(D) are diagrams showing the control performed when the traveling vehicle passes through the intersection. Reference to FIG. 2 is appropriately made for each part of the host controller 4 and the traveling vehicle 3.

Figure 4A:
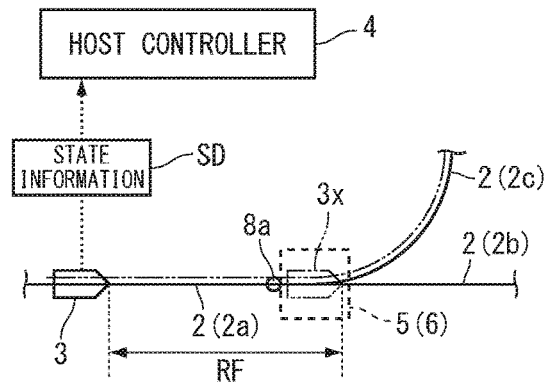
FIGS. 4(A)-4(D) are diagrams showing control performed when a traveling vehicle passes through an intersection.

In FIG. 4(A), the determiner 17 of the traveling vehicle 3 determines, on the basis of the current location of the traveling vehicle 3, whether or not there is an intersection 5 within a predetermined distance RF of scheduled traveling of the traveling vehicle 3. In FIG. 4(A), the symbol 3x denotes a position that the traveling vehicle 3 reaches when a predetermined length of time has elapsed. In FIG. 4(A), the intersection 5 (branching part 6) is present within the predetermined distance RF, and the traveling controller 16 generates state information SD (see FIG. 3(A)) including a passage permission request (CN) for the branching part 6, on the basis of the determination result of the determiner 17. The communicator 18 of the traveling vehicle 3 transmits the state information SD to the communicator 25 of the host controller 4, and the communicator 25 receives the state information SD (passage permission request). The host controller 4 uses the received state information SD to update the state table ST (FIG. 3(B)) stored in the memory storage 26, and the intersection controller 22 uses the updated state table ST to update the intersection information SC (see FIG. 3(C)).

In FIG. 4(A), the branching part 6 is in the unblocked state, and the intersection controller 22 of the host controller 4 generates permission for the traveling vehicle 3 to pass through the branching part 6. Moreover, in FIG. 4(B), the communicator 25 transmits a passage permission PP to the communicator 18 of the traveling vehicle 3, and the communicator 18 receives the passage permission PP. The passage permission PP is, for example, a part of the travel instruction (see FIG. 2). However, the communicator 18 may transmit the passage permission PP separately from the travel instruction.

Figure 4B:
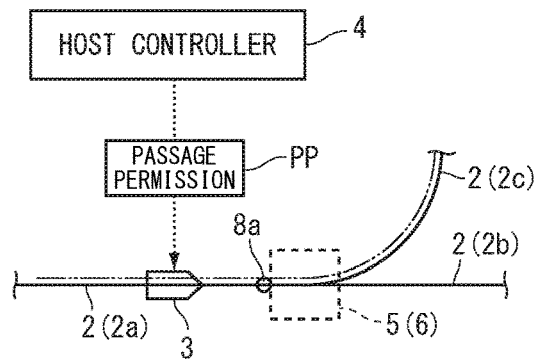
Figure 4C:
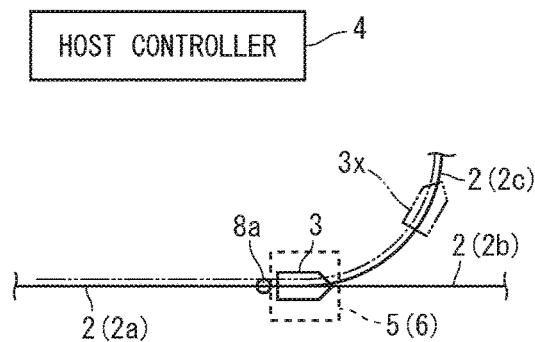
Figure 4D:
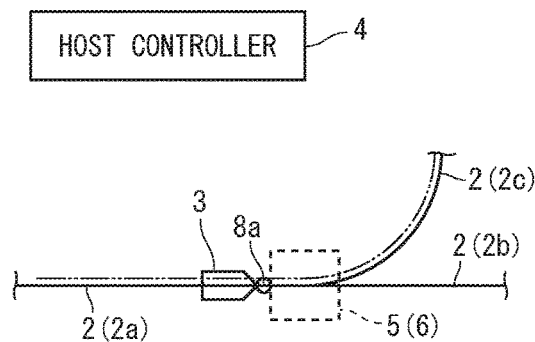

When the passage permission PP is received, the traveling vehicle 3 is traveling at a location short of the waiting position 8a related to the branching part 6 (see FIG. 4(B)), and the traveling vehicle 3 enters the branching part 6 as shown in FIG. 4(C) and passes through the branching part 6 as indicated by symbol 3x. When the passage permission is not received before reaching the waiting position 8a, the traveling vehicle 3 stops at the waiting position 8a as shown in FIG. 4(D) and does not enter the branching part 6. Moreover, when the passage permission is received while stopped at the waiting position 8a, the traveling vehicle 3 resumes traveling, enters the branching part 6, and passes through the branching part 6.

Next, the control when the priority traveling vehicle 3a is present will be described. When the communicator 25 has received a passage permission request indicating that the priority traveling vehicle 3a (see FIG. 1) is scheduled to pass through the branching part 6, the first deriver 23 of FIG. 2 derives the traveling vehicle 3b (see FIG. 1) that is the transmission origin of the passage permission request indicating the scheduled passage of the branching part 6. The first deriver 23 uses the traveling vehicle information stored in the memory storage 26 to derive the traveling vehicle 3b. That is to say, the first deriver 23 derives the traveling vehicle 3b already requesting a passage permission for the branching part 6 at the point in time where the passage permission request for the branching part 6 is received from the priority traveling vehicle 3a. This traveling vehicle information is, for example, the intersection information SC of FIG. 3(C), and is information in which the passage permission request received by the communicator 25 is associated with the traveling vehicle 3 of the transmission origin thereof.

The first deriver 23 derives the traveling vehicle 3b by checking the intersection 5 corresponding to the passage permission request from the priority traveling vehicle 3a against the intersection information SC (see FIG. 3(C)). For example, in the state information SD (see FIG. 3(A)), the passage permission request (CN) indicates the target intersection ID, and the first deriver 23 acquires (derives) the target intersection ID from the passage permission request (CN) when communicator 25 has received the state information SD (passage permission request) from the priority traveling vehicle 3a. Then, using the intersection information SC in FIG. 3(C) or the history (log) thereof, the first deriver 23 acquires the traveling vehicle ID of the traveling vehicle that transmitted the passage permission request for the branching part 6 before the priority traveling vehicle 3a, to thereby derive the traveling vehicle (traveling vehicle 3b) corresponding to this traveling vehicle ID. When the traveling vehicle 3b is derived, the merging part deriver 29 cross-checks the traveling vehicle 3b with the intersection information SC, and derives the merging part 7 as an intersection through which the traveling vehicle 3b is scheduled to pass after the branching part 6.

Furthermore, when the traveling vehicle 3b (see FIG. 1) derived by the first deriver 23 is scheduled to pass through the merging part 7 as the intersection 5 ahead of the branching part 6, the second deriver 24 of FIG. 2 derives the traveling vehicle 3c scheduled to pass through the merging part 7 from a direction different from a direction from which the traveling vehicle 3b is scheduled to pass through the merging part 7. At the point in time where the first deriver 23 derives the traveling vehicle 3b, the second deriver 24 derives a second traveling vehicle (for example, the traveling vehicle 3c) by cross-checking the merging part 7 for which the traveling vehicle 3b is already requesting passage permission against the intersection information SC (see FIG. 3(C)). For example, at the point in time where the first deriver 23 derives the traveling vehicle 3b, the second deriver 24 acquires the "intersection ID" of the merging part 7 through which the traveling vehicle 3b is scheduled to pass, from the intersection information SC (see FIG. 3(B)). Then, the second deriver 24 acquires the traveling vehicle ID of the transmission origin of the passage permission request for the merging part 7, using the intersection information SC of FIG. 3(C), to thereby derive the traveling vehicle (for example, the traveling vehicle 3c) corresponding to this traveling vehicle ID.

The first deriver 23 may derive the traveling vehicle 3b by using the state table ST (see FIG. 3(B)) instead of the intersection information SC as the traveling vehicle information. For example, the first deriver 23 may search for the "traveling vehicle ID" for which the intersection ID for the "passage permission request" in the state table ST is the same as that of the priority vehicle 3a, to derive the traveling vehicle (traveling vehicle 3b) that corresponds to this "traveling vehicle ID". Similarly, the second deriver 24 may derive the traveling vehicle 3c by using the state table ST (see FIG. 3(B)) instead of the intersection information SC.

The intersection controller 22 suspends transmission of a passage permission for the merging part 7 to the traveling vehicle 3c derived by the second deriver 24. For example, in the "traveling vehicle ID of passage permission request transmission origin" of the intersection information SC (FIG. 3(C)), the intersection controller 22 moves the traveling vehicle ID of the traveling vehicle 3c down to a position in the queue after the traveling vehicle ID of the traveling vehicle 3b to thereby delay the transmission of the passage permission to the traveling vehicle 3c. Furthermore, the intersection controller 22 generates a passage permission for the merging part 7 for the traveling vehicle 3b (first traveling vehicle) in priority to other traveling vehicles (for example, traveling vehicle 3c). The passage permission generated by the intersection controller 22 is transmitted to the traveling vehicle 3b by the communicator 25.

In summary of the above description, this example is characterized in that the priority traveling vehicle 3a requests a passage permission for the branching part 6 so that the traveling vehicle 3b (the first traveling vehicle) passing through the branching part 6 is derived from the intersection information SC and the like and, further, the merging part 7 through which the traveling vehicle 3b passes is derived from the intersection information SC and the like, to thereby allow the traveling vehicle 3b to pass through the merging part 7 in priority to the other traveling vehicle 3c and the like.

Figure 5:
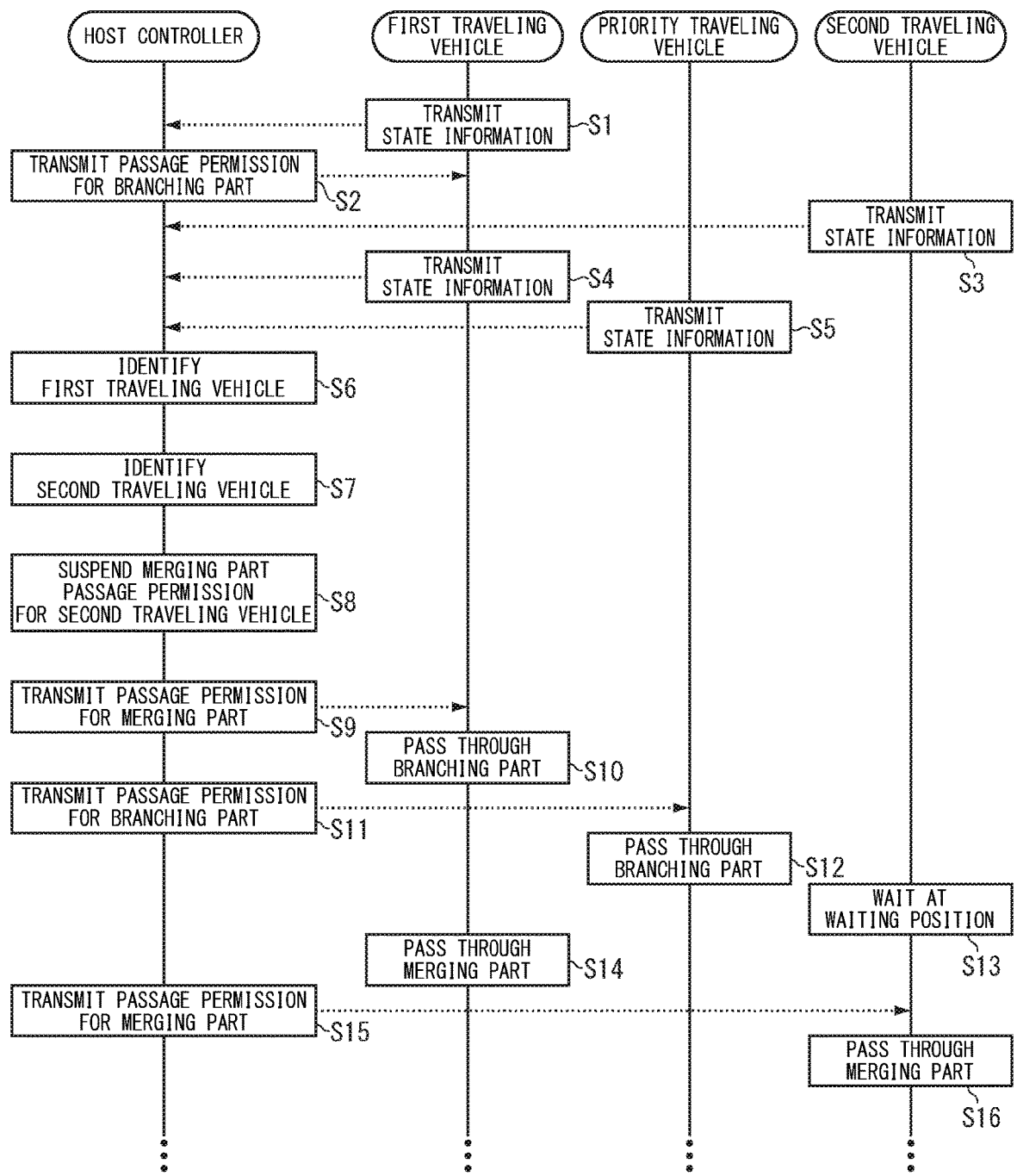
FIG. 5 is a flowchart showing a control method for a traveling vehicle system according to the first example.

Next, the control when there is a priority traveling vehicle will be described, with reference to FIGS. 5 and 6(A)-6(D). FIG. 5 is a flowchart showing a control method for the traveling vehicle system according to the example. FIGS. 6(A)-6(D) are diagrams showing an operation of the traveling vehicle system according to the example. Reference to FIG. 2 is appropriately made for each part of the "host controller" and each part of the "traveling vehicle". The "first traveling vehicle" in FIG. 5 is the traveling vehicle 3b preceding the priority traveling vehicle 3a in FIG. 6(A). The "second traveling vehicle" in FIG. 5 is the traveling vehicle 3c scheduled to pass through the merging part 7 of FIG. 6(A) from a direction different from a direction from which the traveling vehicle 3b (first traveling vehicle) is scheduled to pass through the merging part 7.

As illustrated in FIG. 5, in Step S1, the communicator 18 of the "first traveling vehicle" transmits the state information to the communicator 25 of the "host controller", and the communicator 25 receives the state information. The "first traveling vehicle" (traveling vehicle 3b in FIG. 6(A)) is traveling at a location short of the branching part 6, and the state information includes a passage permission request for the branching part 6. The "host controller" uses the received state information to update the state table ST (see FIG. 3(B)), and the intersection controller 22 uses the updated state table ST to update the intersection information SC (see FIG. 3(C)). Similarly, when receiving the state information in the processing thereafter, the "host controller" updates the state table ST and the intersection information SC. Hereinafter, duplicate description on updating of the state table ST and the intersection information SC will be appropriately omitted.

The priority traveling vehicle selector 28 of the "host controller" acquires the "priority" of the traveling vehicle of the transmission origin of the passage permission request (for example, "first traveling vehicle"), using the state table ST (see FIG. 3(B)), and selects whether or not this traveling vehicle is a "priority traveling vehicle". The "first traveling vehicle" is not a "priority traveling vehicle" and thus is not selected as a priority traveling vehicle by the priority traveling vehicle selector 28. The intersection controller 22 generates a passage permission for the branching part 6 for the "first traveling vehicle". In Step S2, the communicator 25 of the "host controller" transmits the passage permission for the branching part 6 to the communicator 18 of the "first traveling vehicle", and the communicator 18 receives the passage permission.

In Step S3, the communicator 18 of the "second traveling vehicle" transmits the state information to the communicator 25 of the "host controller", and the communicator 25 receives the state information. The "second traveling vehicle" (traveling vehicle 3c in FIG. 6(B)) is traveling at a location short of the merging part 7, and the state information includes the passage permission request for the merging part 7. In Step S4, the communicator 18 of the "first traveling vehicle" transmits the state information to the communicator 25 of the "host controller", and the communicator 25 receives the state information. The "first traveling vehicle" (traveling vehicle 3b in FIG. 6(B)) is traveling at a location short of the merging part 7, and the state information includes the passage permission request for the merging part 7. For example, when there is a traveling vehicle passing through the merging part 7, the merging part 7 is in the blocking state, and the passage permission for the first traveling vehicle and the passage permission for the second traveling vehicle are suspended.

In Step S5, the communicator 18 of the "priority traveling vehicle" transmits the state information to the communicator 25 of the "host controller", and the communicator 25 receives the state information. The "priority traveling vehicle" (traveling vehicle 3a in FIG. 6(B)) is traveling at a location short of the branching part 6, and the state information includes the passage permission request for the branching part 6. The priority traveling vehicle selector 28 acquires the "priority" of the traveling vehicle of the transmission origin of the passage permission request, using the state table ST (see FIG. 3(B)), and selects whether or not this traveling vehicle is a "priority traveling vehicle". This traveling vehicle is a "priority traveling vehicle", and the first deriver 23 of the "host controller" uses the intersection information SC (see FIG. 3(C)) to derive the "first traveling vehicle" in Step S6. At the point in time where the first traveling vehicle is derived, the merging part deriver 29 derives the merging part 7 through which the first traveling vehicle is scheduled to pass after the branching part 6.

Figure 6A:
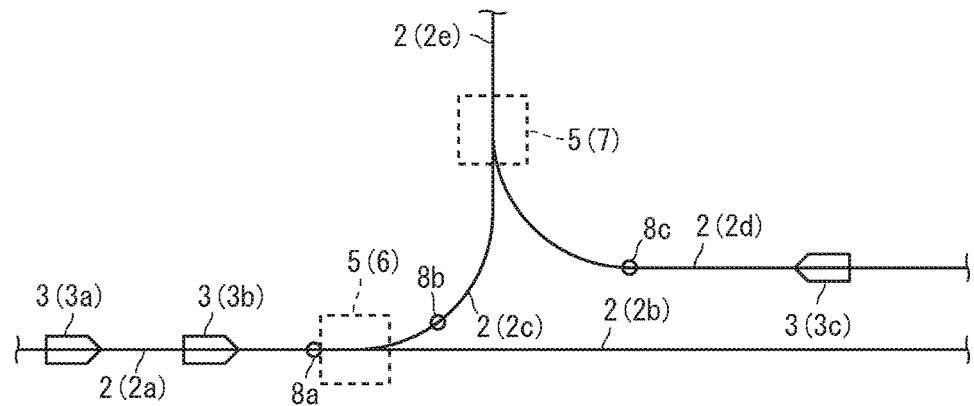
FIGS. 6(A)-6(D) are diagrams showing an operation of the traveling vehicle system according to the first example.
Figure 6B:
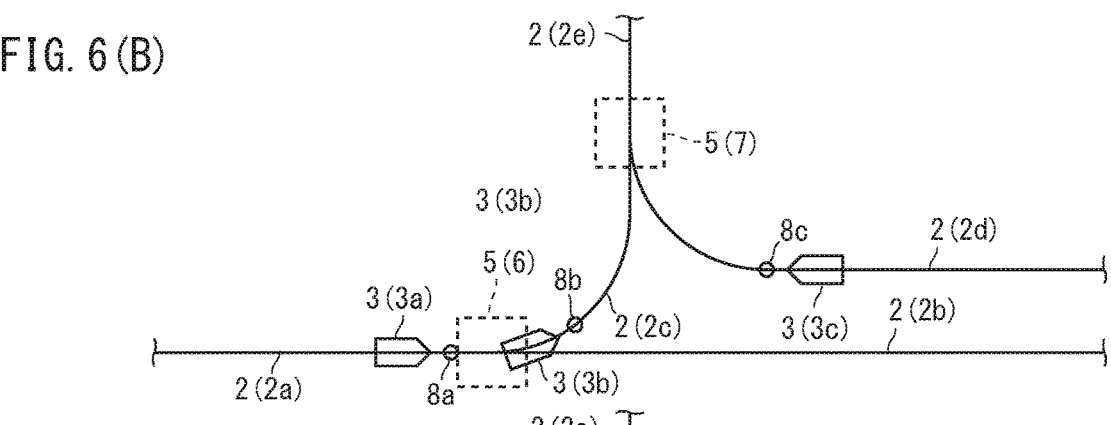
Figure 6C:
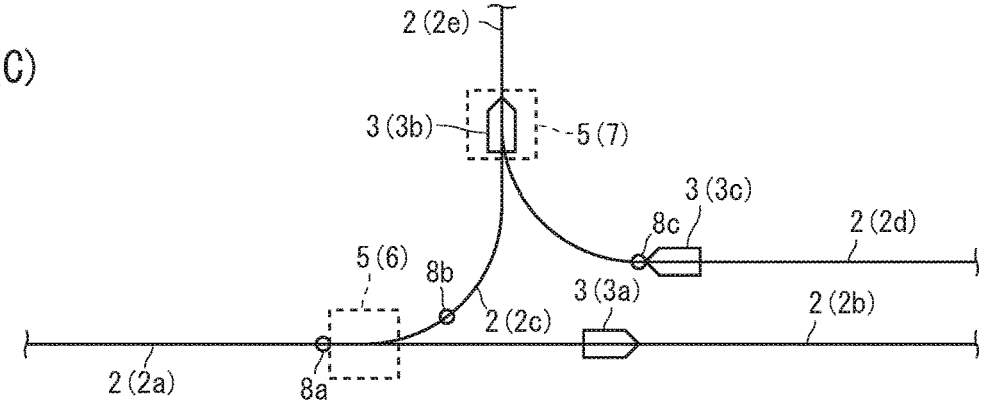
Figure 6D:
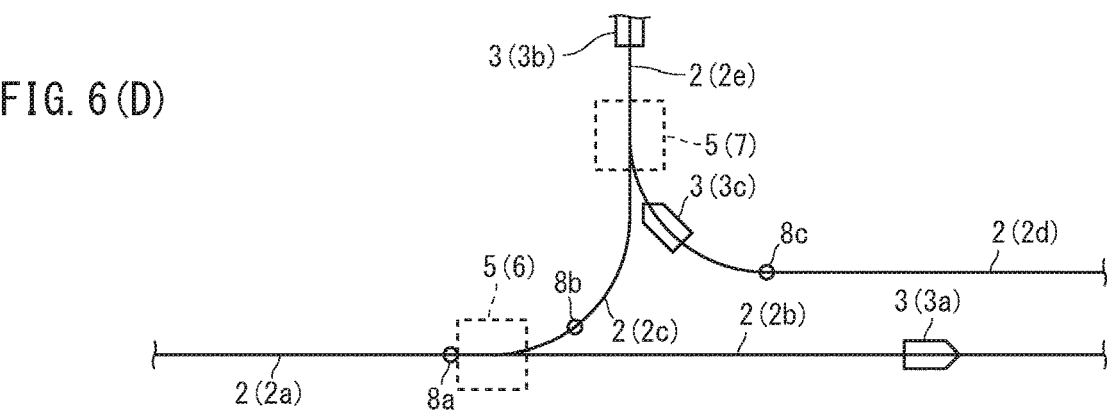

The second deriver 24 of the "host controller" uses the intersection information SC (see FIG. 3(C)) to derive the "second traveling vehicle" in Step S7. In the state of FIG. 6(B), if the host controller 4 grants the traveling vehicle 3c a passage permission for the merging part 7, the traveling vehicle 3b sometimes has to wait at the waiting position 8b before finishing passing through the branching part 6. In this example, the branching part 6 is not released from the blocking state, and the priority traveling vehicle 3a has to wait at the waiting position 8a as a result of the passage permission for the branching part 6 not being granted. Therefore, in Step S8, the intersection controller 22 of the "host controller" suspends the passage permission for the "second traveling vehicle" for the merging part 7, and generates a passage permission for the "first traveling vehicle" for the merging part 7. In Step S9, the communicator 25 of the "host controller" transmits the passage permission for the merging part 7 to the communicator 18 of the "first traveling vehicle", and the communicator 18 receives the passage permission. The "first traveling vehicle" (traveling vehicle 3b in FIG. 6(C)) passes through the branching part 6 in Step S10, and the "second traveling vehicle" (traveling vehicle 3c in FIG. 6(C) waits at the waiting position 8c of the merging part 7 in Step S13. The intersection controller 22 of the "host controller" generates a passage permission for the "priority traveling vehicle" for the branching part 6 after the "first traveling vehicle" has passed through the branching part 6. In Step S11, the intersection controller 22 of the "host controller" transmits the passage permission for the branching part 6 to the communicator 18 of the "priority traveling vehicle", and the communicator 18 receives the passage permission for the branching part 6. The "priority traveling vehicle" (see FIG. 6(C)) passes through the branching part 6 in Step S12.

The "first traveling vehicle" passes through the merging part 7 in Step S14. The intersection controller 22 of the "host controller" generates a passage permission for the "second traveling vehicle" for the merging part 7. In Step S15, the communicator 25 of the "host controller" transmits the passage permission for the merging part 7 to the communicator 18 of the "second traveling vehicle", and the communicator 18 receives the passage permission. The "second traveling vehicle" (traveling vehicle 3c in FIG. 6(D)) passes through the merging part 7 in Step S16. As described above, the traveling vehicle system 1A can reduce the possibility of the priority traveling vehicle 3a being stopped at the branching part 6 by simple control, and can allow smooth traveling of the priority traveling vehicle 3a.

Second Example

Figure 7A:
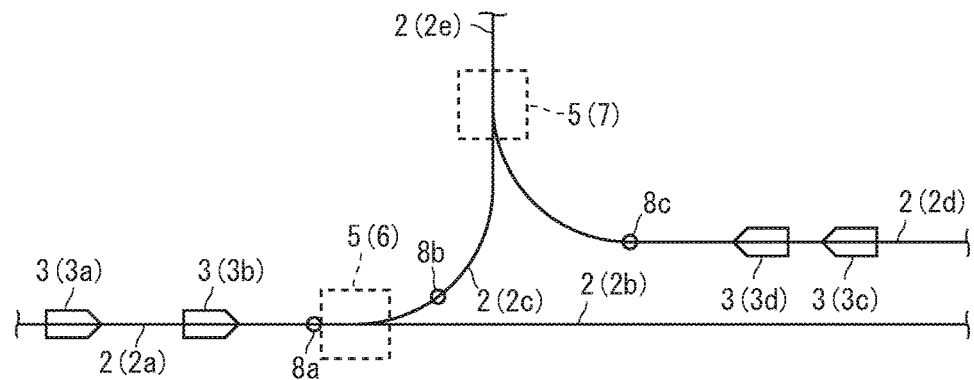
FIGS. 7(A)-7(D) are diagrams showing an operation of a traveling vehicle system according to a second example.
Figure 7B:
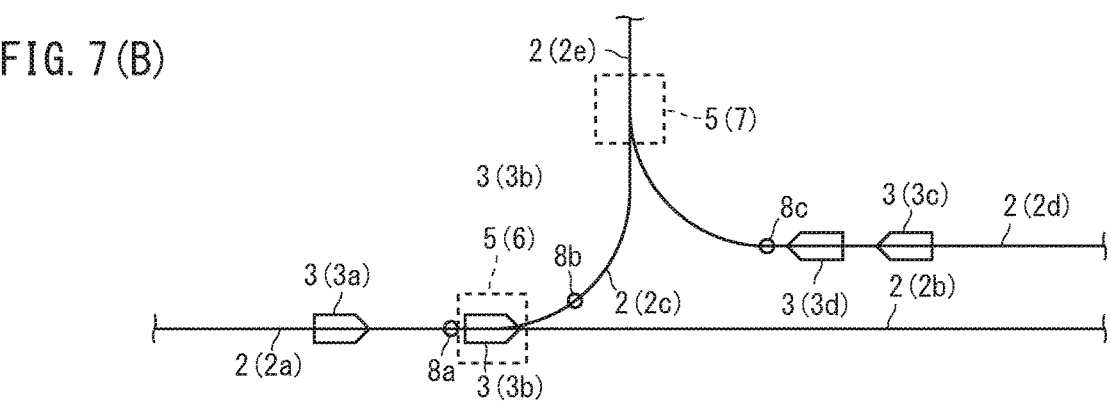

Hereunder, a second example is described. In this example, similar members as those described above are assigned with the same symbols and the descriptions thereof are omitted or simplified. FIGS. 7(A)-7(D) are diagrams showing an operation of a traveling vehicle system according to this example. Reference to FIG. 2 and the like is appropriately made for each part of the host controller 4 and each part of the traveling vehicle 3. In FIG. 7(A), the traveling vehicle 3d (the third traveling vehicle) is a traveling vehicle traveling ahead on the same route as the traveling vehicle 3c. When each traveling vehicle 3 travels as shown in FIG. 7(B), the traveling vehicle 3d transmits a passage permission request for the merging part 7 to the host controller 4 (see FIG. 2) before the traveling vehicle 3b. At the point in time where receipt of the passage permission request related to the merging part 7 from the traveling vehicle 3b preceding the priority traveling vehicle 3a is recognized, the communicator 25 of the host controller 4 has already transmitted a passage permission related to the merging part 7 to the traveling vehicle 3d. That is to say, when the intersection controller 22 (see FIG. 2) suspends transmission of the passage permission for the merging part 7 to the traveling vehicle 3c, the host controller 4 has already transmitted the passage permission to the traveling vehicle 3d preceding the traveling vehicle 3c.

Figure 7C:
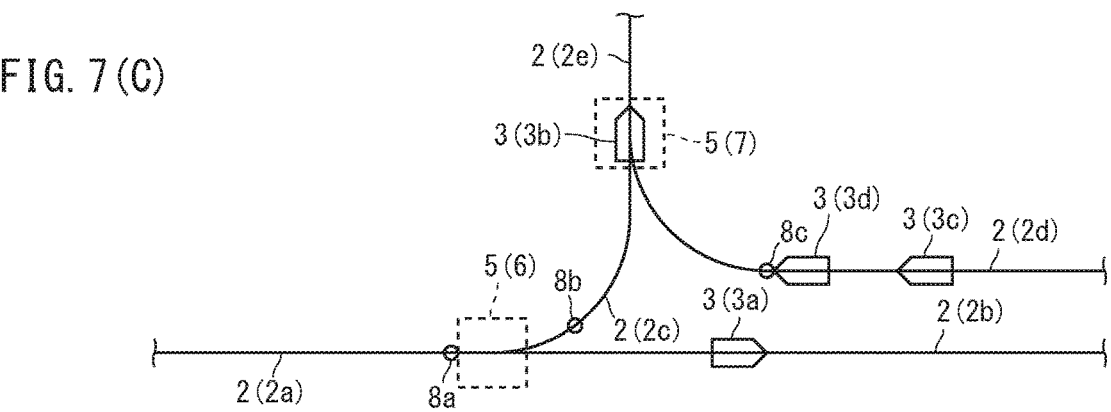

The intersection controller 22 (see FIG. 2) of the host controller 4 transmits to the communicator 18 of the traveling vehicle 3d cancellation information to cancel the passage permission for the traveling vehicle 3d in relation to the merging part 7. When the traveling vehicle 3d has not passed through the merging part 7 when the cancellation information is received, the traveling vehicle 3d stops at the waiting position 8c related to the merging part 7 as shown in FIG. 7(C), and suspends passing through the merging part 7. As shown in FIGS. 7(B) and 7(C), the traveling vehicle 3b passes through the branching part 6 and proceeds to the merging part 7, and the priority traveling vehicle 3a passes through the branching part 6 and proceeds to the section 2b after the traveling vehicle 3b has passed through the branching part 6.

Figure 7D:
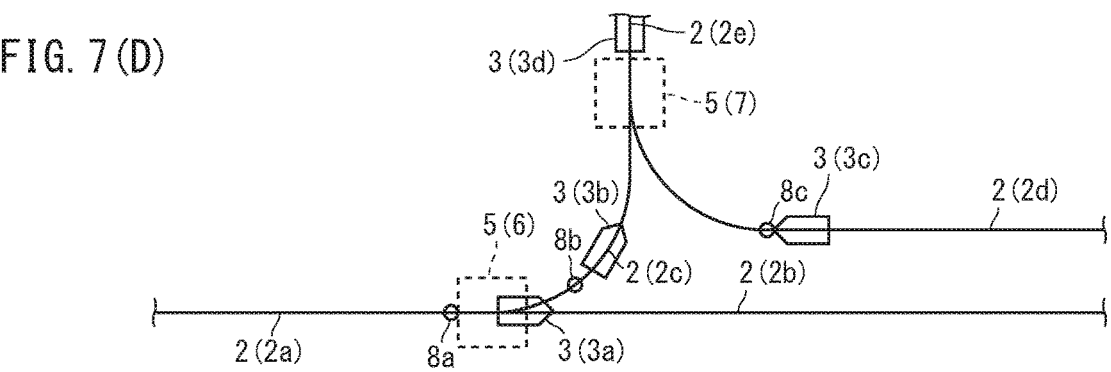

When the traveling vehicle 3d has already passed through the waiting position 8c related to the merging part 7 when the cancellation information is received, the traveling vehicle 3d, as shown in FIG. 7(D), passes through the merging part 7 as with an example not having received the cancellation information. The traveling vehicle 3b proceeds to the merging part 7 after the traveling vehicle 3d has passed through the merging part 7, and the priority traveling vehicle 3a passes through the branching part 6 after the traveling vehicle 3b has passed through the branching part 6. The traveling vehicle 3c waits at the waiting position 8c until the traveling vehicle 3b has passed through the merging part 7, and proceeds to the merging part 7 after the traveling vehicle 3b has passed through the merging part 7. In this example, the priority traveling vehicle 3a may potentially stop at the waiting position 8a or may potentially decelerate and proceed to the waiting position 8a, until the traveling vehicle 3b has passed through the branching part 6. However, as compared to when the traveling vehicle 3c proceeds to the merging part 7 before the traveling vehicle 3b, it is possible to reduce the amount of time required for the priority traveling vehicle 3a to stop or decelerate, and allow the priority traveling vehicle 3a to travel smoothly.

Figure 8:
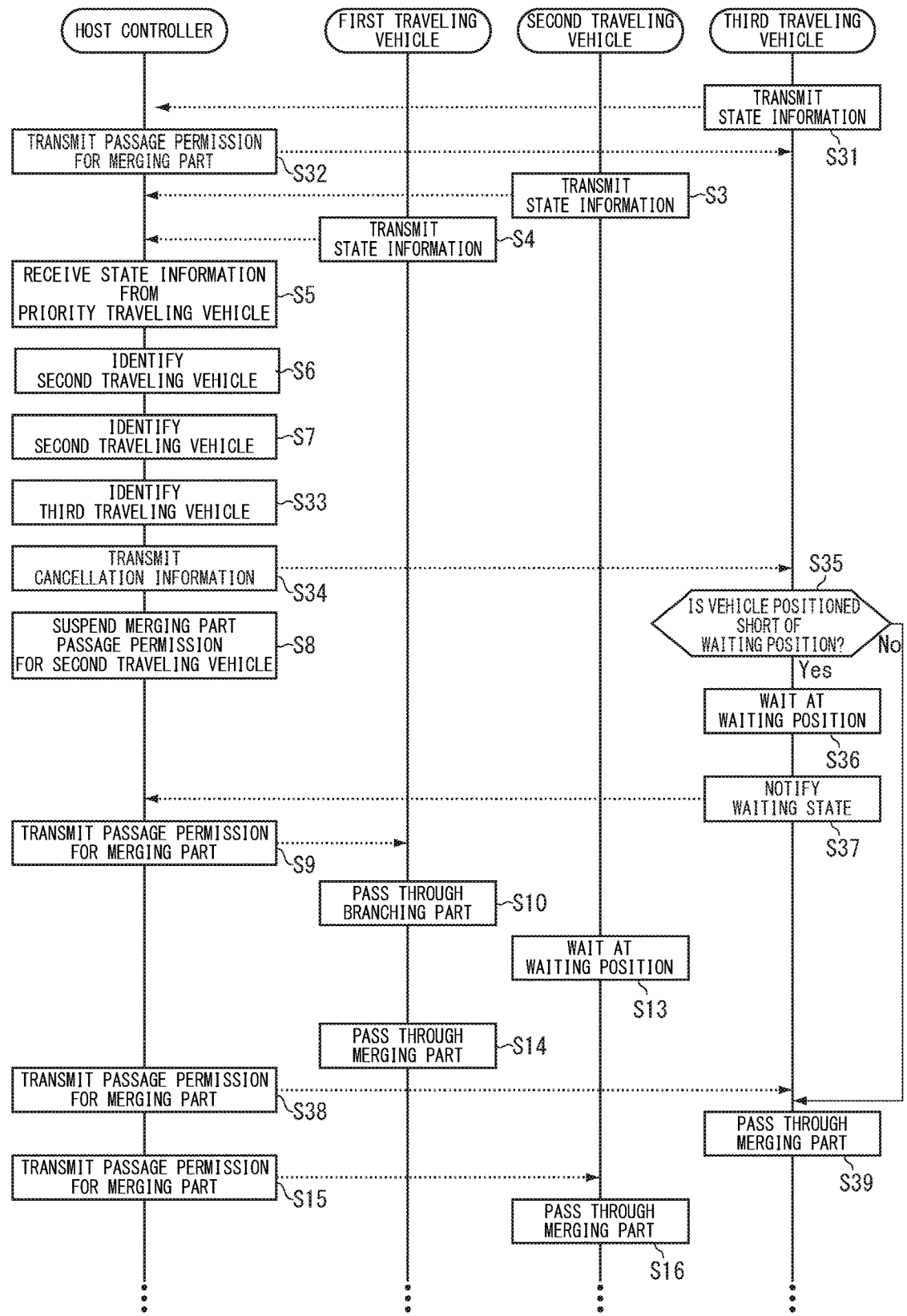
FIG. 8 is a flowchart showing a control method for a traveling vehicle system according to the second example.

FIG. 8 is a flowchart showing a control method for the traveling vehicle system according to this example. In FIG. 8, the same processes as those in FIG. 5 are assigned with the same symbols and the descriptions thereof are omitted or simplified. Although illustration of the operation of the priority traveling vehicle is omitted in FIG. 8, the operation of the priority traveling vehicle is the same as that in FIG. 5.

In Step S31, the communicator 18 of the "third traveling vehicle" transmits state information to the communicator 25 of the "host controller", and the communicator 25 receives the state information. The "third traveling vehicle" is traveling at a location short of the merging part 7 (see FIG. 7(A)), and the state information of Step S31 includes a passage permission request for the merging part 7. The intersection controller 22 of the "host controller" generates a passage permission for the "third traveling vehicle" for the merging part 7. In Step S32, the communicator 25 of the "host controller" transmits the passage permission for the merging part 7 to the communicator 18 of the "third traveling vehicle", and the communicator 18 receives the passage permission.

The processing from Step S3 to Step S7 is the same as that in FIG. 5. In Step S33, the intersection controller 22 of the "host controller" derives the traveling vehicle to which a passage permission for the merging part 7 has been granted, as the "third traveling vehicle". For example, the intersection controller 22 of the "host controller" derives, as the "third traveling vehicle", the traveling vehicle to which the passage permission for the merging part 7 has been granted during a predetermined period of time prior to the point in time where the "second traveling vehicle" was derived in Step S7.

In Step S34, the intersection controller 22 of the "host controller" transmits cancellation information to cancel the passage permission to the communicator 18 of the "third traveling vehicle", and the communicator 18 receives the cancellation information. In step S35, the traveling controller 16 of the "third traveling vehicle" determines whether or not the "third traveling vehicle" is at a location short of the waiting position 8c. If the traveling controller 16 determines that the "third traveling vehicle" is at a location short of the waiting position 8c (Step S35; Yes), the "third traveling vehicle" waits at the waiting position 8c in Step S36. In Step S37, the communicator 18 of the "third traveling vehicle" transmits to the communicator 25 of the "host controller" a notification to notify that the "third traveling vehicle" is in a waiting state (waiting notification), and the communicator 25 receives the waiting notification.

The processing from Step S8 to Step S14 is the same as that in FIG. 5. The intersection controller 22 of the "host controller" generates a passage permission for the "third traveling vehicle" in relation to the merging part 7, after the "first traveling vehicle" has passed through the merging part 7 in Step S14. In Step S38, the communicator 25 of the "host controller" transmits the passage permission for the merging part 7 to the communicator 18 of the "third traveling vehicle", and the communicator 18 receives the passage permission. After having received the passage permission of Step S38, or if the traveling controller 16 determines that the "third traveling vehicle" is not at a location short of the waiting position 8c in Step S35 (Step S35; No), the "third traveling vehicle" passes through the merging part 7 in Step S39. If the traveling controller 16 determines that the "third traveling vehicle" is not at a location short of the waiting position 8c in Step S35 (Step S35; No), the processing from Step S9 to Step S14 is performed after the processing of Step S39. The processing in Step S15 and Step S16 is the same as that in FIG. 5.

Third Example

Figure 9A:
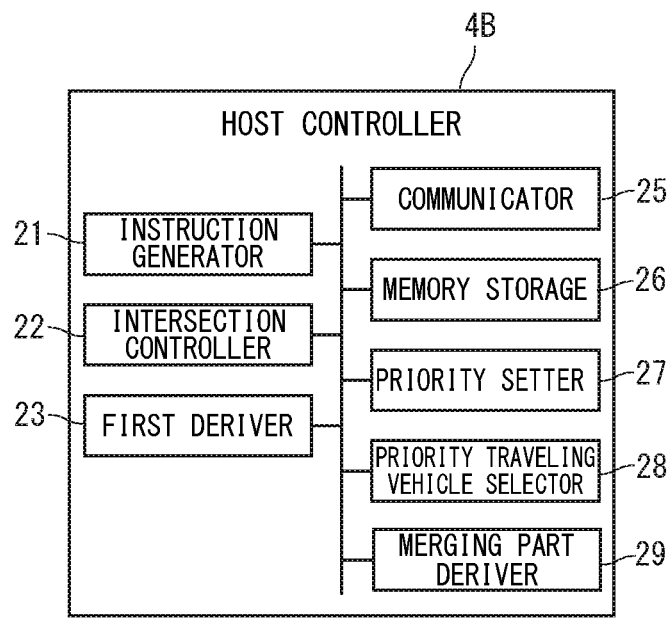
FIGS. 9(A)-9(B) are diagrams showing a host controller and an operation of a traveling vehicle system according to a third example.
Figure 9B:
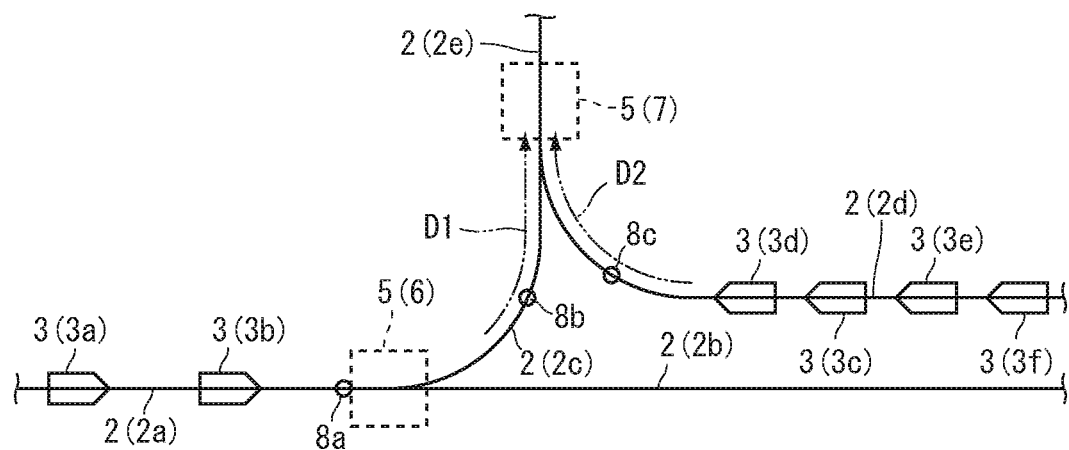

Hereunder, a third example is described. In this example, similar members as those described above are assigned with the same symbols and the descriptions thereof are omitted or simplified. FIGS. 9(A)-9(B) are diagrams showing a host controller and an operation of a traveling vehicle system according to this example. A host controller 4B of this example does not include the second deriver 24 of FIG. 2. The intersection controller 22 sets a priority direction in which passage is prioritized among a plurality of traveling directions (first direction D1, second direction D2) toward the merging part 7. When the priority direction is set to the second direction D2, as long as a predetermined condition is satisfied, the intersection controller 22 sequentially grants a passage permission to each of traveling vehicles 3c to 3f traveling from the second direction D2 toward the merging part 7. The above predetermined condition is, for example, that there is a passage permission request from the traveling vehicle 3 that is traveling from the second direction D2 toward the merging part 7. In this example, the intersection controller 22 suspends the passage permission for the traveling vehicle 3 traveling from the first direction D1 toward the merging part 7 until the plurality of traveling vehicles 3c to 3f traveling from the second direction D2 toward the merging part 7 have passed through the merging part 7.

When a priority traveling vehicle 3a is present, the first deriver 23 derives the first traveling vehicle (traveling vehicle 3b) preceding the priority traveling vehicle 3a as described in the first example. The intersection controller 22 sets the first direction D1, in which the traveling vehicle 3b derived by the first deriver 23 is traveling toward the merging part 7, as the priority direction. After having set the first direction D1 as the priority direction, the intersection controller 22 suspends the permission for the traveling vehicle 3 traveling from the second direction D2 toward the merging part 7 to pass through the merging part 7. The intersection controller 22 grants a passage permission to the priority traveling vehicle 3a for the branching part 6 after the traveling vehicle 3b has passed through the branching part 6. After the traveling vehicle 3b has passed through the merging part 7, the intersection controller 22 sets the second direction D2 as the priority direction, and releases the suspension of the passage permission for the traveling vehicle 3 traveling from the second direction D2 toward the merging part 7. As has been described above, by setting the traveling direction of the traveling vehicle 3b (first direction D1) among the plurality of traveling directions toward the merging part 7 as a traveling direction, the passage of which is prioritized over the other direction (second direction D2), the intersection controller 22 allows the first traveling vehicle (traveling vehicle 3b) to pass through the merging part 7 in priority to the other traveling vehicle 3 and suspends the passage permission for the second traveling vehicle (traveling vehicle 3c). When a passage permission is granted to the traveling vehicle 3d for the merging part 7 and also the priority direction remains in the second direction D2, the first traveling vehicle (traveling vehicle 3b) is not allowed to pass through the merging part 7 until the traveling vehicle 3f has passed through the merging part 7 even if the traveling vehicle 3b (first traveling vehicle) requested passage permission before the traveling vehicle 3c (or the traveling vehicles 3d, 3e, and 3f). This example prevents this type of situation from occurring and, by changing the priority direction from the second direction D2 to the first direction D1, the traveling vehicle 3b (first traveling vehicle) can be granted with a passage permission for the merging part 7 before the traveling vehicles 3c, 3d, 3e, and 3f.

Figure 10:
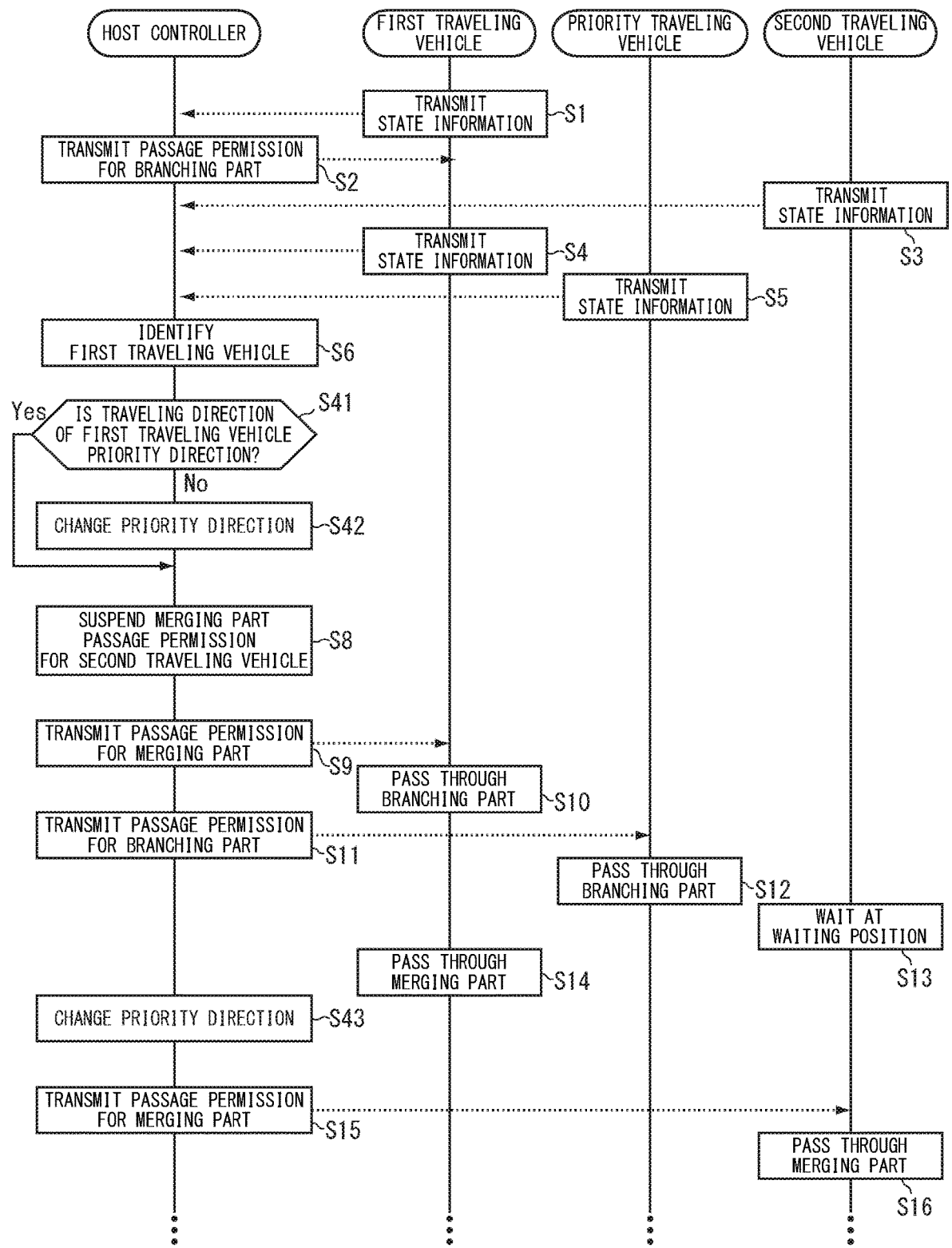
FIG. 10 is a flowchart showing a control method for a traveling vehicle system according to the third example.

FIG. 10 is a flowchart showing a control method for the traveling vehicle system according to the third example. The processing from Step S1 to Step S6 is the same as that in FIG. 5. In Step S41, the intersection controller 22 of the "host controller" determines whether or not the traveling direction of the "first traveling vehicle" is the priority direction in relation to the merging part 7. If the traveling direction of the "first traveling vehicle" is determined as not being the priority direction (Step S41; No), the intersection controller 22 changes the priority direction of the merging part 7 to the traveling direction of the "first traveling vehicle" in Step S42. If the traveling direction of the "first traveling vehicle" is determined as being the priority direction (Step S41; Yes), the intersection controller 22 maintains the priority direction of the merging part 7 and performs the processing thereafter.

The processing from Step S8 to Step S16 is the same as that in FIG. 5. After the "first traveling vehicle" has passed through the merging part 7 in Step S14, the intersection controller 22 of the "host controller" changes the priority direction in Step S43 and generates passage permission for the "second traveling vehicle" for the merging part 7. In Step S15, the communicator 25 of the "host controller" transmits the passage permission for the merging part 7 to the communicator 18 of the "second traveling vehicle", and the communicator 18 receives the passage permission. The "second traveling vehicle" passes through the merging part 7 in Step S16. In this manner, the "host controller" can still suspend the passage permission for the "second traveling vehicle" for the merging part 7 without having to derive the "second traveling vehicle".

In the above example, the host controller includes, for example, a computer system. The host controller reads a control program stored in a memory storage device (not shown in the figure) and executes various processes according to the control program. This control program is a control program for a traveling vehicle system that comprises: a host controller; and a plurality of traveling vehicles that travel on a track having an intersection in a form of either a branching part or a merging part, that transmit to the host controller a passage permission request for the intersection through which the traveling vehicle is scheduled to pass, and that pass through the intersection if a passage permission for the passage permission request is received from the host controller but stop before the intersection if the passage permission is not received. The control program causes a computer to perform processes including: receiving the passage permission request from the traveling vehicle; transmitting the passage permission to one of the plurality of traveling vehicles requesting the passage permission; storing traveling vehicle information in which the passage permission request received from the traveling vehicle is associated with the traveling vehicle of the transmission origin thereof; selecting a priority traveling vehicle from the plurality of traveling vehicles; deriving a first traveling vehicle, which is the transmission origin of the passage permission request for the branching part, from the traveling vehicle information already stored, at the time of receiving the passage permission request for the branching part from the priority traveling vehicle; deriving, from the stored traveling vehicle information, the merging part through which the first traveling vehicle is scheduled to pass after the branching part; and transmitting the passage permission for the derived merging part to the first traveling vehicle in priority to a second traveling vehicle scheduled to pass through the merging part from a direction different from a direction from which the first traveling vehicle is scheduled to pass through the merging part. This control program may be recorded and provided in a computer-readable storage medium.

The technical scope of this disclosure is not limited to the mode described in the above examples. One or more of the requirements described in the above examples may be omitted. One or more of the requirements described in the above examples may be appropriately combined. In addition, the contents of Japanese Patent Application No. 2016-161834 and all documents cited herein are incorporated herein by reference to the extent permitted by law.

The invention claimed is:

1. A traveling vehicle system comprising:
a host controller; and
a plurality of traveling vehicles that travel on a track having an intersection in a form of either a branching part or a merging part, transmit to the host controller a passage permission request for the intersection through which the traveling vehicle is scheduled to pass, and pass through the intersection if a passage permission for the passage permission request is received from the host controller, but stop before the intersection if the passage permission is not received;
wherein
the host controller includes:
a memory storage that stores traveling vehicle information in which the passage permission request received from the traveling vehicle is associated with the traveling vehicle of the transmission origin thereof;
a priority traveling vehicle selector that selects a priority traveling vehicle from the plurality of traveling vehicles;
a first deriver that derives a first traveling vehicle, which is the transmission origin of the passage permission request for the branching part, from the traveling vehicle information already stored in the memory storage, at the time of receiving the passage permission request for the branching part from the priority traveling vehicle;
a merging part deriver that derives, from the traveling vehicle information stored in the memory storage, a merging part through which the first traveling vehicle is scheduled to pass after the branching part; and
an intersection controller that transmits the passage permission for the derived merging part to the first traveling vehicle in priority to a second traveling vehicle scheduled to pass through the merging part from a direction different from a direction from which the first traveling vehicle is scheduled to pass through the merging part.

2. The traveling vehicle system according to claim 1, further comprising:
a second deriver that derives the second traveling vehicle from the traveling vehicle information stored in the memory storage, wherein
the intersection controller suspends transmission of the passage permission for the merging part to the second traveling vehicle when the passage permission request for the merging part is received from the second traveling vehicle derived by the second deriver.

3. The traveling vehicle system according to claim 2, wherein
the traveling vehicle includes:
a determiner that determines whether or not there is the intersection within a predetermined distance of scheduled traveling of the traveling vehicle, on the basis of a current location of the traveling vehicle; and
a communicator that transmits the passage permission request for the intersection to the host controller if there is the intersection within this distance.

4. The traveling vehicle system according to claim 2, wherein when one of a plurality of directions toward the merging part can be set as a priority direction for which the passage permission is not granted to the traveling vehicle traveling toward the merging part from another direction so long as the passage permission request for the direction is present, the intersection controller suspends transmission of the passage permission for the merging part to the second traveling vehicle by setting the traveling direction of the first traveling vehicle traveling toward the merging part as a priority direction.

5. The traveling vehicle system according to claim 2, wherein:
when suspending transmission of the passage permission for the merging part to the second traveling vehicle when the passage permission has been transmitted to a third traveling vehicle preceding the second traveling vehicle, the intersection controller transmits to the third traveling vehicle cancellation information to cancel the passage permission for the third traveling vehicle; and
the third traveling vehicle stops before the merging part if the merging part has not been passed when the cancellation information is received.

6. The traveling vehicle system according to claim 1, wherein
the traveling vehicle includes:
a determiner that determines whether or not there is the intersection within a predetermined distance of scheduled traveling of the traveling vehicle, on the basis of a current location of the traveling vehicle; and
a communicator that transmits the passage permission request for the intersection to the host controller if there is the intersection within this distance.

7. The traveling vehicle system according to claim 6, wherein the priority traveling vehicle has the predetermined distance that is relatively long among the plurality of traveling vehicles.

8. The traveling vehicle system according to claim 7, wherein when one of a plurality of directions toward the merging part can be set as a priority direction for which the passage permission is not granted to the traveling vehicle traveling toward the merging part from another direction so long as the passage permission request for the direction is present, the intersection controller suspends transmission of the passage permission for the merging part to the second traveling vehicle by setting the traveling direction of the first traveling vehicle traveling toward the merging part as a priority direction.

9. The traveling vehicle system according to claim 7, wherein:
when suspending transmission of the passage permission for the merging part to the second traveling vehicle when the passage permission has been transmitted to a third traveling vehicle preceding the second traveling vehicle, the intersection controller transmits to the third traveling vehicle cancellation information to cancel the passage permission for the third traveling vehicle; and the third traveling vehicle stops before the merging part if the merging part has not been passed when the cancellation information is received.

10. The traveling vehicle system according to claim 6, wherein when one of a plurality of directions toward the merging part can be set as a priority direction for which the passage permission is not granted to the traveling vehicle traveling toward the merging part from another direction so long as the passage permission request for the direction is present, the intersection controller suspends transmission of the passage permission for the merging part to the second traveling vehicle by setting the traveling direction of the first traveling vehicle traveling toward the merging part as a priority direction.

11. The traveling vehicle system according to claim 6, wherein:
when suspending transmission of the passage permission for the merging part to the second traveling vehicle when the passage permission has been transmitted to a third traveling vehicle preceding the second traveling vehicle, the intersection controller transmits to the third traveling vehicle cancellation information to cancel the passage permission for the third traveling vehicle; and
the third traveling vehicle stops before the merging part if the merging part has not been passed when the cancellation information is received.

12. The traveling vehicle system according to claim 1, wherein when one of a plurality of directions toward the merging part can be set as a priority direction for which the passage permission is not granted to the traveling vehicle traveling toward the merging part from another direction so long as the passage permission request for the direction is present, the intersection controller suspends transmission of the passage permission for the merging part to the second traveling vehicle by setting the traveling direction of the first traveling vehicle traveling toward the merging part as a priority direction.

13. The traveling vehicle system according to claim 12, wherein:
when suspending transmission of the passage permission for the merging part to the second traveling vehicle when the passage permission has been transmitted to a third traveling vehicle preceding the second traveling vehicle, the intersection controller transmits to the third traveling vehicle cancellation information to cancel the passage permission for the third traveling vehicle; and
the third traveling vehicle stops before the merging part if the merging part has not been passed when the cancellation information is received.

14. The traveling vehicle system according to claim 1, wherein:

when suspending transmission of the passage permission for the merging part to the second traveling vehicle when the passage permission has been transmitted to a third traveling vehicle preceding the second traveling vehicle with respect to a position on the track, the intersection controller transmits to the third traveling vehicle cancellation information to cancel the passage permission for the third traveling vehicle; and
the third traveling vehicle stops before the merging part if the merging part has not been passed when the cancellation information is received.

15. A method of controlling a traveling vehicle system comprising:
a host controller; and
a plurality of traveling vehicles that travel on a track having an intersection in a form of either a branching part or a merging part, transmit to the host controller a passage permission request for the intersection through which the traveling vehicle is scheduled to pass, and pass through the intersection if a passage permission for the passage permission request is received from the host controller, but stop before the intersection if the passage permission is not received;
the method comprising:
receiving the passage permission request from the traveling vehicle;
transmitting the passage permission to one of the plurality of traveling vehicles requesting the passage permission;
storing traveling vehicle information in which the passage permission request received from the traveling vehicle is associated with the traveling vehicle of the transmission origin thereof;
selecting a priority traveling vehicle from the plurality of traveling vehicles;
deriving a first traveling vehicle, which is the transmission origin of the passage permission request for the branching part, from the traveling vehicle information already stored at the time of receiving the passage permission request for the branching part from the priority traveling vehicle;
deriving from the stored traveling vehicle information the merging part through which the first traveling vehicle is scheduled to pass after the branching part; and
transmitting the passage permission for the derived merging part to the first traveling vehicle in priority to a second traveling vehicle scheduled to pass through the merging part from a direction different from a direction from which the first traveling vehicle is scheduled to pass through the merging part.

* * * * *